United States Patent
Santos et al.

(10) Patent No.: US 11,726,165 B1
(45) Date of Patent: Aug. 15, 2023

(54) ESTIMATION OR VERIFICATION OF DISTANCE OF A TARGET WITH ANGLE OF ARRIVAL OR ANGLE OF DEPARTURE DATA

(71) Applicant: SWORD HEALTH, S.A., Oporto (PT)

(72) Inventors: Pedro Henrique Oliveira Santos, Oporto (PT); José Carlos Coelho Alves, Oporto (PT); Márcio Filipe Moutinho Colunas, Oporto (PT); João Paulo Dias Andrade, Oporto (PT); Virgílio António Ferro Bento, Oporto (PT)

(73) Assignee: SWORD HEALTH, S.A., Oporto (PT)

(*) Notice: Subject to any disclaimer, the term of this patent is extended or adjusted under 35 U.S.C. 154(b) by 0 days.

(21) Appl. No.: 17/941,918

(22) Filed: Sep. 9, 2022

(30) Foreign Application Priority Data

Jul. 5, 2022 (EP) .................................... 22398015

(51) Int. Cl.
*G01S 5/02* (2010.01)
*G01S 5/04* (2006.01)
(Continued)

(52) U.S. Cl.
CPC .......... *G01S 5/0284* (2013.01); *G01S 5/0264* (2020.05); *G01S 5/04* (2013.01); *G01S 5/08* (2013.01); *G08B 21/18* (2013.01)

(58) Field of Classification Search
CPC .... G01S 5/0284; G01S 5/0264; G01S 5/0268; G01S 5/04; G01S 5/08
(Continued)

(56) References Cited

U.S. PATENT DOCUMENTS 7,688,264 B2 * 3/2010 Chun .................... G01S 5/0284
342/450
8,723,729 B2 * 5/2014 Desai ........................ G01S 3/50
342/433
(Continued)

FOREIGN PATENT DOCUMENTS

WO WO-2019082236 A1 * 5/2019 ............. G01S 19/42
WO WO-2019243438 A1 12/2019

*Primary Examiner* — Chuong P Nguyen
(74) *Attorney, Agent, or Firm* — Wilson Sonsini Goodrich & Rosati

(57) ABSTRACT

A method comprising: wirelessly receiving, at a first device, at least one data packet from each second device of a plurality of second devices arranged at predetermined locations of a target; detecting an angle of arrival of each at least one data packet wirelessly received of at least a pair of second devices; calculating at least one angle difference between the angles of arrival associated with the pair of second devices, or between the angles of arrival associated with each of the pair of second devices and a predetermined direction; and determining whether the target is at a predetermined distance range from the first device by estimating the distance based on the at least one angle difference, and a predetermined distance between the predetermined locations; or checking whether each of the at least one angle difference is within a predetermined angle range for the predetermined locations of the pair of second devices. Also, a method for making such determination based on angles of departure.

23 Claims, 4 Drawing Sheets

(51) Int. Cl.
*G08B 21/18* (2006.01)
*G01S 5/08* (2006.01)

(58) Field of Classification Search
USPC ........................................ 342/451, 350, 417
See application file for complete search history.

(56) References Cited

U.S. PATENT DOCUMENTS

| | | | |
|---|---|---|---|
| 9,939,516 B2* | 4/2018 | Ranki | G01S 5/04 |
| 10,429,488 B1* | 10/2019 | Parks | G01S 5/02213 |
| 11,057,742 B2* | 7/2021 | Schober | G01S 5/12 |
| 11,143,735 B2* | 10/2021 | Lehtimaki | H04B 1/713 |
| 2007/0147482 A1* | 6/2007 | Shirai | H04L 27/12 375/150 |
| 2011/0199263 A1* | 8/2011 | Kang | G01S 3/04 342/442 |
| 2016/0370450 A1* | 12/2016 | Thorn | G01S 5/08 |
| 2019/0086505 A1* | 3/2019 | Malik | H04L 69/22 |
| 2022/0308829 A1* | 9/2022 | Colunas | G09B 19/0038 |

\* cited by examiner

ESTIMATION OR VERIFICATION OF DISTANCE OF A TARGET WITH ANGLE OF ARRIVAL OR ANGLE OF DEPARTURE DATA

CROSS-REFERENCE TO RELATED APPLICATIONS

This application claims the benefit of European Application No. 22398015.2, filed on Jul. 5, 2022, which is incorporated by reference herein in its entirety.

TECHNICAL FIELD

The present disclosure relates to the technical field of electronic devices. More particularly, the disclosure relates to the estimation and monitoring of the distance between a target with a plurality of electronic devices and an electronic device remote from the target that wirelessly communicates with the plurality of electronic devices, and/or the verification of the location of the target relative to the electronic device distance-wise.

BACKGROUND

The effectiveness of some processes depends upon the distance between electronic devices that take part of the processes. Some exemplary tasks of processes that are influenced by distance are: the devices wirelessly communicating data one to another, the devices or the position thereof being optically detected and/or identified, the devices capturing and processing sound pressure waves, etc. In these cases, there is an optimal distance range between the involved devices within which the processes are successfully conducted, and the probability of success being lower when the separation between the devices is outside of the optimal distance range.

The estimation and monitoring of distances is important to minimize the risk of not conducting the processes in a successful manner for a number of reasons: the confidence in the success of the processes becomes greater, corrective actions might be taken to put the devices within the optimal distance range whenever the distance is outside of the range, and/or preventive actions might be taken to reduce the probability of the devices being at a distance outside of the range while still being within the optimal distance range.

When it comes to electronic devices that establish wireless communications, one of the most widely used metrics for distance estimation is the Received Signal Strength Indicator, RSSI, which is a measurement of the strength of the signal with which a specific device has received the signal. The RSSI may be sent to other electronic devices, for instance to the signal-emitting device, for information purposes. However, the RSSI values tend to vary too much depending on the antennas of the devices (the type of antennas and/or their condition), the presence of objects between the devices, etc. Therefore, even if estimation of the distance between the sending and receiving devices can be estimated based on the RSSI, it is not possible to be sure whether the RSSI values are simply caused by the propagation distance (i.e. the losses of the electromagnetic waves radiated by the emitting device and captured by the receiving device) or whether other influencing factors have changed the strength of the received signals, so reliance on RSSI is preferably minimized.

Other ways of estimating the distance are hence generally used like, by way of example, with ranging measuring devices like depth sensors, LIDAR or even image processing of images capturing the remote device or target. This, on the one hand, makes the processes more costly due to the additional means required for the distance estimation and, on the other hand, are also prone to problems, for example a depth sensor or LIDAR cannot provide an estimation of the distance if there are objects in the way between the two devices, like a wall or a person.

Systems and procedures capable of estimating the distance of a target or verifying the location of the target in terms of distance that overcome at least part of the above shortcomings is deemed necessary.

SUMMARY

A first aspect of the disclosure relates to a method comprising:

wirelessly receiving, at a first device, at least one data packet from each second device of a plurality of second devices arranged at predetermined locations of a target, the first device comprising an antenna array, and each second device comprising at least one antenna;

detecting, at the first device, an angle of arrival of each at least one data packet wirelessly received, each angle of arrival being associated with one second device of at least a pair of second devices of the plurality of second devices;

calculating, at the first device, at least one angle difference either between the angles of arrival associated with the pair of second devices, or between the angles of arrival associated with each of the pair of second devices and a predetermined direction; and determining, at the first device when the at least one angle difference is greater than a predetermined minimum angle difference, whether the target is at a predetermined distance range from the first device by:

estimating a distance of the target from the first device or both maximum and minimum distances that the target may be from the first device based on: each of the at least one angle difference, and a predetermined distance between the predetermined locations of the pair of second devices; or checking whether each of the at least one angle difference is within a predetermined angle range for the predetermined locations of the pair of second devices.

The determination of whether the target is at the predetermined distance relies on the wireless communications taking place between at least three devices: the first device and at least two second devices. Regardless of the presence of objects in-between the first device and each of the two second devices, the distance can be estimated or verified, and so even if there are losses due to any objects affecting the propagation of the electromagnetic waves, the estimation might be accurate because it does not depend on the strength with which signals are received at the receiving device, i.e. the first device.

The second devices, each of which is apart from the other(s) on the target, provide data packet(s) to the first device that serves, upon reception by the first device, for the detection of the angle of arrival of the respective electromagnetic waves. The angles of arrival are representative of the location of the second devices relative to the first device.

The first device has data about where each second device is located on the target, namely the first device has the data about the predetermined locations. The first device combines the predetermined locations with the angles of arrival to determine whether the target is at the predetermined distance range. For that, the first device resorts to either one of the following two techniques.

The first device is capable of estimating the distance of the target from the first device by the relationship between the distance that the pair of second devices is apart and the difference in the angles of arrival of the two. The estimated distance is then compared with the predetermined distance range to check whether the target is at a predetermined distance range. In some cases, the first device estimates possible minimum and maximum distances that the target may be from the first device in the same manner by considering possible minimum and maximum distances that the pair of second devices might be apart. For example, when the target is a person and data such as height, width, length of body members, etc. is not provided to the first device, preferably limiting distances between the pair of second devices may be established beforehand by making measurements between the predetermined locations on people with different builds and heights. In those cases, regardless of the particularities of the user with the second devices, minimum and maximum distances between the target and the first device can be estimated and compared with the predetermined thresholds.

Alternatively, the first device is capable of associating the distance (or minimum and maximum distances as explained above) that the pair of second devices is apart with a predetermined angular range whose angular limits (i.e. minimum and maximum angles) correspond to the minimum and maximum difference in angle of arrival that the first device can measure to consider the target to be within the predetermined distance range. When the calculated angle difference is within the predetermined angular range, it is determined that the target is within the predetermined distance range. The configuration of the predetermined angular range can be carried out by experimental tests whereby the target with the plurality of second devices at the predetermined locations is, in one test, at the minimum distance of the distance range from the first device and the difference in angle of arrival is computed from the received data packets, and, in another test, the target is at the maximum distance of the distance range and the difference in angle of arrival is respectively computed. The configuration of the predetermined angular range can also be carried out by digital processing or simulation since the position of all the devices can be digitally set and the distances and angles be computed.

The angle difference might be computed using, as reference, the direction corresponding to the angle of arrival of the data packet(s) of one second device, and the direction corresponding to the angle of arrival of the data packet(s) of the other second device be related to the reference (i.e. the direction of said one second device). Alternatively, it might be computed using, as reference, a predetermined direction set according to the antenna array of the first device and in relation to which the angles of arrival of the data packet(s) of each second device of the pair are established; the two angles of arrival are then combined to find the angle difference between the pair of second devices since they are provided in relation to the same reference, i.e. the predetermined direction.

The predetermined direction is e.g. a 3D direction or axis when the antenna array enables angle of arrival detection relative to more than one plane, and e.g. a plane when the antenna array enables angle of arrival detection relative to one plane; the plane can be seen as a concatenation of 2D directions or axes that are parallel, so one of these 2D directions or axes is sufficient. Further, the predetermined direction may be contained in a plane that cuts a segment connecting at least two antennas of the antenna array. As known in the art, depending on the number of antennas and arrangement thereof in the antenna array, phase shifts and/or time arrival of the signals received by the antenna array makes possible to determine the angle of arrival in respect of one or more planes. Any predetermined direction can be set in the antenna array, for example it is common that the bisector of the segment connecting two antennas in an antenna array is the reference for angle of arrival detection; in this case, the bisector can be extended into a plane that is defined with said segment as the normal vector of the plane. Irrespective of the predetermined direction selected, the angle difference resulting from the angles of arrival of the signals of the pair of second devices will be the same.

In some embodiments: the calculation of the at least one angle difference comprises calculating: a first angle difference between the angle of arrival of one device of the pair of second devices and the predetermined direction, and a second angle difference between the angle of arrival of the other device of the pair of second devices and the predetermined direction; and the determination of whether the target is within the predetermined distance range comprises estimating the distance or both the maximum and minimum distances based on a trigonometrical relationship between each of: the first and second angle differences, the predetermined direction, and the predetermined distance between the predetermined locations of the pair of second devices.

The first device uses the predetermined direction as the reference for the calculation of respective angle differences. The first and second angle differences together with the predetermined distance define a triangle, the vertices thereof being the first device and the pair of second devices. The distance of the target from the first device is generally estimated by way of a segment that has the first device as first endpoint, and the middle point of the segment connecting the two second devices as second endpoint. Said distance segment can be computed by processing the trigonometrical relationship that exists between the different sides and angles of the triangle.

In some embodiments, the predetermined direction is such that it forms first and second right triangles with the first and second angle differences, respectively, wherein one of the edges of the first and second right triangles that forms the right angle is parallel with the predetermined direction; wherein estimating the distance or both the maximum and minimum distances comprises computing trigonometrical relationships between the first and second angle differences and the predetermined distance between the predetermined locations of the pair of second devices.

In some embodiments, the determination of whether the target is within the predetermined distance range comprises estimating the distance or both the maximum and minimum distances by computing a height of an isosceles triangle whose base is the predetermined distance and the remaining two edges are parallel to directions corresponding to the angles of arrival associated with the pair of second devices.

In some embodiments, the at least one angle difference is with respect to an azimuth or an elevation of the angles of arrival associated with the pair of second devices, and the predetermined distance is a distance with respect to an axis corresponding to the same one of the azimuth or the elevation of the at least one angle difference.

The determination of the target being or not being within the predetermined distance range is made possible when the axis along which the pair of second devices are apart on the target is a horizontal axis or a vertical axis.

When the angles of arrival are not directly in the direction of the azimuth or the elevation, for instance because the angles of arrival are detected in two perpendicular dimensions, the angle difference is computed such that the directions corresponding to the detected angles of arrival are first projected onto a plane corresponding to the azimuth or the elevation, that is a horizontal plane or a vertical plane respectively, and then the angle difference of the resulting projections is calculated. For the digital provision of either plane by the first device so that projection of directions onto it is made possible, the first device might be capable of figuring out how to provide said plane based on the features of the antenna array it has and the detected angles of arrival, or based on measurements provided by an inertial measurement unit that the first device preferably comprises. The inertial measurement unit provides the orientation data necessary for the first device, for example it may include an accelerometer in addition to e.g. a gyroscope and/or a magnetometer, and based on the measured gravity acceleration, the first device figure out what is the e.g. normal vector that is to define the necessary plane for projections.

In some embodiments, wherein the at least one angle difference is with respect to a combination of an azimuth and an elevation of the angles of arrival associated with the pair of second devices, and the predetermined distance is a distance with respect to an axis corresponding to the combination of the azimuth and the elevation of the at least one angle difference.

The determination of the target being or not being within the predetermined distance range is made possible when the axis along which the pair of second devices are apart on the target is a combination of a horizontal axis with a vertical axis, namely, the axis extends in a direction that has both a variating azimuth and a variating elevation.

In some embodiments of the first aspect and/or the second aspect below, the determination is made further when the at least one angle difference is less than a predetermined maximum angle difference.

It is sometimes desirable not to determine whether the target is within the predetermined distance range if the at least one angle difference exceeds a predetermined maximum angle difference, for example 50° or more, 60° or more, 90° or more, etc. The reason for that is that slight changes in the distance of the target typically cause a considerable change in angle difference, which lowers the confidence in the determination being correct.

The angle difference might have a considerable value when the target is too close to the first device, and/or when the distance between the predetermined locations of the second devices is considerable.

In some embodiments of the first aspect and/or the second aspect below, the method further comprises determining, at the first device when the at least one angle difference is equal to or less than the predetermined minimum angle difference, whether the target is at the predetermined distance range from the first device by at least one of:

estimating the distance of the target from the first device or both the maximum and minimum distances that the target may be from the first device based on a received signal strength indicator in the at least one wirelessly received data packet associated with each of the pair of second devices, the received signal strength indicators being associated with one or more packets received from the first device at the respective second devices; and repeating the detecting step for the at least one data packet wirelessly received from each second device of the plurality of devices, repeating the calculating step for all pairs of second devices of the plurality of devices, selecting the pair of second devices with the greatest at least one angle difference, and repeating the determining step for the selected pair of second devices if the respective at least one angle difference is greater than the predetermined minimum angle difference.

When the angle difference is low according to the predetermined minimum angle difference, the confidence in the determination being correct is also low because the orientation of the target relative to the first device might be such that the triangle formed by the first device and the pair of second devices is too skewed, and/or inaccurate angle of arrival (or angle of departure in the case of the second aspect below) detections have a considerable influence in the determination to be made.

In these cases, the determination can rely on a different pair of second devices that cause the at least one angle difference to be the greatest. For a same distance between the first device and the target, the greatest angle difference will be obtained for a different pair of second devices with predetermined locations apart along an axis that may form an angle with the axis of the pair of predetermined locations that formed a low angle. In fact, when this occurs, the greater the angle that the two axes form, the more accurate the determination might be. Additionally, or alternatively, the determination can rely on the RSSI values measured by the second devices, which albeit not always accurate, can be used in limiting cases without requiring any additional equipment in the devices.

In some embodiments of the first aspect and/or the second aspect below, the first device and the plurality of second devices form part of a motion tracking system, and each second device of the plurality of second devices comprises an inertial measurement unit; and the method further comprises:

when the first device determines that the target is within the predetermined distance range from the first device, processing, at the first device, wirelessly received measurements of the inertial measurement unit of each second device of the plurality of second devices to provide a motion tracking sequence of the target or of at least portions thereof having a second device arranged thereon.

Further, in some of these embodiments, the method further comprises:

when the first device determines that the target is not within the predetermined distance range from the first device, halting, at the first device, a motion tracking process or requesting user input on whether the motion tracking process is to be halted or not.

The motion tracking system allows a target to have the motion thereof or of parts thereof. The target may preferably be a person, in which case her/his body members are motion tracked in applications such as machine-supervised physical rehabilitation.

With reference to embodiments in which the target is a person, the first device receives the measurements of the IMUs of the motion trackers, i.e. the plurality of second devices, that are attached to body members of the person, and computes a motion tracking sequence with the received measurements. The first device then compares the motion tracking sequence with e.g. a set of constraints associated with the concerned body members and movements to be performed by the person to assess whether the person is conducting the physical rehabilitation adequately. An exemplary assessment procedure is the one disclosed in WO2019243438A1, which is hereby incorporated by reference in its entirety.

When the person is not at the right distance range from the first device, there is a risk that measurements of some or all IMUs will not reach the first device. There is likewise the risk of optical detection errors that might occur when the motion tracking system has an optical sensor that detects body members or the devices thereon to identify the movement of the body members. Whatever the source of error, the resulting motion tracking sequence might reflect movements not actually performed by the person, so even if the person conducts the physical rehabilitation adequately, the first device will not consider so, and possible guidance provided to the user for correction of her/his movements may lead the person to an incorrect performance of prescribed movements. The motion tracking system may be configured to let the user decide whether she/he wants to assume the risk and, thus, not halt the motion tracking process.

In some embodiments of the first aspect and/or the second aspect below, halting the motion tracking process further comprises commanding provision of one or more user perceptible signals comprising:

an indication that the target is not within the predetermined distance range from the first device; and/or an indication of how the target shall move or be moved to be within the predetermined distance range, said indication being of moving closer to or moving further away from the first device.

The determination of whether the target is within the predetermined distance range may establish that the target is outside said range because it is too far away or too close to the first device. By evaluating in which one of the two cases the target is, the first device is capable of determining the indication of how the target must move or be moved to get within the range.

In some embodiments of the first aspect and/or the second aspect below, the method further comprises:

processing, at the first device, one or more images of the target taken by an optical sensor; and at least one of:

validating, at the first device with the one or more processed images, that the pair of second devices is arranged at the respective predetermined locations of the target; and estimating, at the first device with the one or more processed images, the predetermined distance and replacing a previous predetermined distance.

The visual inspection of the locations of the pair of second devices on the target by way of the optical sensor reduces the likelihood of incorrect determinations about the distance of the target. It can happen that the second devices are not arranged where they are supposed to be arranged, either because the initial arrangement has not been correct or because the second devices have moved on the target. By way of example, when the target is a person that exercises with motion thereof being tracked, the second devices which are typically motion trackers tend to move due to gravity, the accelerations imposed by the person on its body, and the second devices not being tightly fixed to the person.

The first device performs image processing on the image(s) taken by the optical sensor to identify the location of the second devices. Based on the identification, the first device may either adjust the predetermined locations of the data it has about the second devices so as to account for the deviations of the second devices from the original predetermined locations, or command provision of user perceptible signals indicative of incorrect placement of the second devices on the target. As the first device measures the variation in position of the second device(s) from the original predetermined location and the actual location, the signals may likewise be indicative of how to correct the placement of the device(s) and not just indicate where the device(s) is supposed to be arranged.

Further, the image processing is configured to measure the distance between the locations where the pair of second devices are so that the first device uses the measured distance in the determination to be made.

In some embodiments of the first aspect and/or the second aspect below: the pair of second devices is selected from all possible pairs of second devices of the plurality of second devices according to a predetermined criterion; or the calculating and determining steps are conducted for all possible pairs of second devices, and the estimated distance or the estimated maximum and minimum distances are averages of estimated values for all possible pairs of second devices.

The first device opts for a given pair of second devices, preferably the pair that shall theoretically yield the most accurate determination based on the predetermined locations on the target and the distance between them, or for average values of computations conducted for all pairs of second devices. The latter alternative generally compensates for errors that could occur during the determination process, for example incorrect placement of a second device, inaccurate angle of arrival (or inaccurate angle of departure in the case of the second aspect below) of a given second device, etc.

In some embodiments of the first aspect and/or the second aspect below, the steps of wirelessly receiving, detecting, calculating and determining are conducted a plurality of times to monitor whether the target is at the predetermined distance range from the first device.

In some embodiments of the first aspect and/or the second aspect below, the first device wirelessly receives the at least one data packet from each second device within a predetermined time duration.

For a more accurate determination, the first device receives the data packets from the second devices with little delay between one data packet and other data packets so that the first device receives the data packet(s) at substantially the same time. When the different data packets are received such that the predetermined time duration is not met, the first device preferably calculates the at least one angle difference when the data packets used for detecting the angles of arrival have been received within the predetermined time duration. Hence, the first device may wait for the reception of data packets of the different second devices such that the time elapsed between the first data packet received and the last data packet received is less than or equal to the predetermined time duration.

In some embodiments of the first aspect and/or the second aspect below, the target is a person standing still and upright when the at least one data packet is wirelessly transmitted by each respective second device of the plurality of second devices and/or when wirelessly received by the first device. In some of these embodiments, the person is further facing towards or away from the first device when the at least one data packet is wirelessly transmitted by each respective second device of the plurality of second devices and/or when wirelessly received by the first device.

In some embodiments, the method further comprises a process as described in the second aspect below for determining whether the target is at the predetermined distance range from the first device at least based on at least one angle difference related to angle of departure data in addition to or instead of the angle of arrival data, or for validating the determination made based on the angle of arrival data. For example, in some embodiments, the method further comprises:

wirelessly receiving, at the first device, the at least one data packet from an antenna array of each second device of a plurality of second devices;

detecting, at the first device, an angle of departure of each at least one data packet wirelessly received, each angle of departure being associated with one second device of at least the pair of second devices;

calculating, at the first device, at least one angle difference related to angles of departure corresponding to 180° (or pi radians) minus the angles of departure associated with the pair of second devices; and at least one of:
estimating, at the first device, the distance of the target from the first device or both maximum and minimum distances that the target may be from the first device based on: the angles of departure associated with the pair of second devices, and the predetermined distance between the predetermined locations of the pair of second devices; or checking whether each of the at least one angle difference related to angles of departure is within the predetermined angle range for the predetermined locations of the pair of second devices;

where the estimation and/or the check are/is for determining, at the first device, whether the target is at the predetermined distance range from the first device and/or for confirming the determination made based on the angles of arrival.

The result of the determination based on angles of arrival and the result of the determination based on angles of departure could be different owing to the distinct angle values obtained with the two methods, but other than in limit situations in which the distance or the angle difference are close to the limits of the respective predetermined range, both determinations shall yield the same result. Hence, one determination can be used for confirmation of the other determination, for example.

A second aspect of the disclosure relates to a method comprising:

wirelessly receiving, at a first device, at least one data packet from an antenna array of each second device of a plurality of second devices arranged at predetermined locations of a target, the first device comprising at least one antenna;

detecting, at the first device, an angle of departure of each at least one data packet wirelessly received, each angle of departure being associated with one second device of at least a pair of second devices of the plurality of second devices;

calculating, at the first device, at least one angle difference corresponding to 180° (or pi radians) minus the angles of departure associated with the pair of second devices; and determining, at the first device when the at least one angle difference is greater than a predetermined minimum angle difference, whether the target is at a predetermined distance range from the first device by:

estimating a distance of the target from the first device or both maximum and minimum distances that the target may be from the first device based on: the angles of departure associated with the pair of second devices, and a predetermined distance between the predetermined locations of the pair of second devices; or checking whether each of the at least one angle difference is within a predetermined angle range for the predetermined locations of the pair of second devices.

Like in the first aspect, the determination of the target being or not being at the predetermined distance relies on the wireless communications taking place between at least three devices: the first device and at least two second devices.

The first device receives data packets from the second devices, each of which is apart from the other(s) on the target. At least two antennas of each second device radiates an electromagnetic wave with a copy of the data packet, which once captured by the first device are processed to detect the angle of departure of the electromagnetic waves by way of the phase shift or time differences between the arrival of the signals (capturing of the electromagnetic waves), thereby detecting where the respective second device is relative to the first device.

A single antenna in the first device suffices for angle of departure detection, even though in some embodiments the first device likewise comprises an antenna array.

As the first device has data about where each second device is located on the target, by evaluating the combination of the predetermined locations with the angles of departure the first device gets to determine whether the target is at the predetermined distance range; it may do so, for instance, in a manner similar to that explained in relation to the first aspect.

In some embodiments, the determination of whether the target is within the predetermined distance range comprises estimating the distance or both the maximum and minimum distances by computing a height of an isosceles triangle whose base is the predetermined distance and the remaining two edges are parallel to directions corresponding to the angles of departure associated with the pair of second devices.

In some embodiments, the angles of departure in the calculating step and/or the determining step are in azimuth or elevation of the angles of departure, and the predetermined distance is a distance with respect to an axis corresponding to the same one of the azimuth or the elevation of the angles of departure.

In some embodiments, the angles of departure in the calculating step and/or the determining step are in a combination of azimuth and elevation of the angles of departure, and the predetermined distance is a distance with respect to an axis corresponding to the combination of the azimuth and the elevation of the angles of departure.

In some embodiments, the first device comprises two or more antennas, i.e. an antenna array.

In some embodiments, the method further comprises a process as described in the first aspect for determining whether the target is at the predetermined distance range from the first device at least based on at least one angle difference related to angle of arrival data in addition to or instead of the angle of departure data, or for validating the determination made based on the angle of departure data. For example, in some embodiments, the method further comprises:

detecting, at the first device, an angle of arrival of each at least one data packet wirelessly received, each angle of arrival being associated with one second device of at least the pair of second devices;

calculating, at the first device, at least one angle difference related to angles of arrival either between the angles of arrival associated with the pair of second devices, or between the angles of arrival associated with each of the pair of second devices and a predetermined direction; and at least one of:
estimating, at the first device, the distance of the target from the first device or both maximum and minimum distances that the target may be from the first device based on: each of the at least one angle difference related to angles of arrival, and the predetermined distance between the predetermined locations of the pair of second devices; and checking, at the first device, whether each of the at least one angle difference related to angles of arrival is within the predetermined angle range for the predetermined locations of the pair of second devices;

where the estimation and/or the check are/is for determining, at the first device, whether the target is at a predetermined distance range from the first device and/or for confirming the determination made based on the angles of departure.

A third aspect of the disclosure relates to a data processing device comprising: at least one processor adapted to perform a method according to the first aspect or the second aspect; and at least one antenna (at least when performing a method according to the first aspect, the at least one antenna comprises two or more antennas). In some embodiments, the data processing device further comprises an inertial measurement unit, IMU, preferably at least comprising a gyroscope and an accelerometer.

A fourth aspect of the disclosure relates to a device comprising: means adapted to execute the steps of a method according to the first aspect or the second aspect; and at least one antenna (at least when performing a method according to the first aspect, the at least one antenna comprises two or more antennas). In some embodiments, the device further comprises an inertial measurement unit, IMU, preferably at least comprising a gyroscope and an accelerometer.

A fifth aspect of the disclosure relates to a motion tracking system comprising: a first device according to the third aspect or the fourth aspect; and a plurality of second devices, each second device comprising: at least one antenna, and an attaching device for attachment to a body member of a user.

In some embodiments, the at least one antenna of each second device of the plurality of second devices comprises two or more antennas.

In some embodiments, the first device and/or each second device of the plurality of second devices further comprises: an inertial measurement unit comprising both a gyroscope and an accelerometer.

The plurality of second device is arrangeable or arranged on different body members of a user for motion tracking thereof. The measurements provided by the plurality of second devices, that is to say, the measurements provided by the IMU of each such device, are transmittable to the first device for processing thereof and provision of a motion tracking sequence. Further, the first device may then compare the motion tracking sequence with a set of constraints to determine whether the body members of the user have been oriented and/or have moved correctly according to the constraints, thereby making it possible to conduct physical rehabilitation without supervision by a therapist.

A sixth aspect of the disclosure relates to a computer program product that has instructions which, when executed by a computing device like e.g. the device of the third aspect or fourth aspect, cause the computing device to carry out the steps of a method according to the first aspect or the second aspect.

In some embodiments, the computer program product is embodied on a non-transitory computer-readable medium or a computer-readable data carrier has the computer program product stored thereon.

A seventh aspect of the disclosure relates to a data carrier signal carrying a computer program product according to the sixth aspect.

Another aspect of the disclosure comprises a method comprising: (a) wirelessly receiving, at a computing device, at least one data packet from a first motion tracking device located on a target and at least one data packet from a second motion tracking device located on the target; (b) detecting, at the computing device, a first angle of arrival or a first angle of departure of the at least one data packet wirelessly received from the first motion tracking device and a second angle of arrival or a second angle of departure of the at least one data packet wirelessly received from the second motion tracking device; (c) calculating, at the computing device, at least one angle difference based at least on (i) the first angle of arrival and the second angle of arrival or (ii) the first angle of departure and the second angle of departure; and (d) determining, at the computing device, whether the target is within a predetermined distance or predetermined distance range from the computing device based at least in part on the at least one angle difference and locations of the first motion tracking device and the second motion tracking device.

In some embodiments, the first motion tracking device has a first predetermined location on the target, and wherein the second motion tracking device has a second predetermined location on the target. In some embodiments, the method further comprises calculating the distance separating the first motion tracking device and the second motion tracking device based on the first predetermined location and the second predetermined location. In some embodiments, the method further comprises calculating a distance between the computing device and the target based on the at least one angle difference and the distance separating the first motion tracking device and the second motion tracking device. In some embodiments, the method comprises determining whether the target is at a predetermined distance from the computing device when the computing device is calibrated for the target. In some embodiments, determining whether the target is at a predetermined distance comprises: estimating a distance of the target from the first device or both maximum and minimum distances that the target may be from the first device based on: the at least one angle difference, and a distance between a location of the first motion tracking device and a location of the second motion tracking device; or checking whether each of the at least one angle difference is within a predetermined angle range for the locations of the first motion tracking device and the second motion tracking device. In some embodiments, the method comprises determining whether the target is within a predetermined distance range from the computing device when the computing device is not calibrated for the target. In some embodiments, calculating the at least one angle difference comprises: calculating a first angle difference between the first angle of arrival of the first motion tracking device and a predetermined direction, and a second angle difference between the second angle of arrival of the second motion tracking device and the predetermined direction. In some embodiments, determining whether the target is within the predetermined distance range comprises estimating a distance or both the maximum and minimum distances between the target and the computing device based on the first and second angle differences, the predetermined direction, and a distance between a location of the first motion tracking device and a location of the second motion tracking device. In some embodiments, the step of determining whether the target is within a predetermined distance or predetermined distance range from the computing device is made further when the at least one angle difference is less than a predetermined maximum angle difference. In some embodiments, the method further comprises estimating, at the computing device, the distance of the target from the computing device or both the maximum and minimum distances that the target may be from the computing device based on received signal strength indicators associated with one or more packets received from the computing device at the first motion tracking device and the second motion tracking device. In some embodiments, the method further comprises repeating the steps of (b)— (d) when the at least one angle difference is greater than a predetermined minimum angle difference. In some embodiments, the computing device and the first motion tracking device and the second motion racking device form at least a part of a motion tracking system. In some embodiments, the first motion tracking device and the second motion tracking device each comprises an inertial measurement unit. In some embodiments, the method further comprises processing, at the computing device, wirelessly received measurements of the inertial measurement unit of each of the first motion racking device and the second motion tracking device to provide a motion tracking sequence of the target when the computing device determines that the target is within the predetermined distance range from the computing device. In some embodiments, the method further comprises halting, at the computing device, a motion tracking process when the computing device determines that the target is not within the predetermined distance range from the computing device. In some embodiments, halting the motion tracking process further comprises at least one of: providing an indication that the target is not within the predetermined distance range from the first device; or an indication of how the target shall move or be moved to be within the predetermined distance range. In some embodiments, the method further comprises processing, at the computing device, one or more images of the target taken by an optical sensor; and at least one of: validating, based on the one or more processed images, that the first motion tracking device and the second motion racking device are arranged at predetermined locations of the target; or estimating, based on the one or more processed images, the predetermined distance. In some embodiments, the at least one angle difference is calculated based on (i) the first angle of arrival and the second angle of arrival. In some embodiments, the at least one angle difference is calculated based on (ii) the first angle of departure and the second angle of departure. In some embodiments, the at least one angle difference is calculated based on both (i) the first angle of arrival and the second angle of arrival and (ii) the first angle of departure and the second angle of departure.

Another aspect of the disclosure is a computing device comprising at least one processor, the at least one processor operative to: (a) wirelessly receive at least one data packet from a first motion tracking device located on a target and at least one data packet from a second motion tracking device located on the target; (b) detect a first angle of arrival or a first angle of departure of the at least one data packet wirelessly received from the first motion tracking device and a second angle of arrival or a second angle of departure of the at least one data packet wirelessly received from the second motion tracking device; (c) calculate at least one angle difference based at least on (i) the first angle of arrival and the second angle of arrival (ii) or the first angle of departure and the second angle of departure; and (d) determine whether the target is within a predetermined distance or predetermined distance range from the computing device based on the at least one angle difference and locations of the first motion tracking device and the second motion tracking device.

Another aspect of the disclosure is a motion tracking system comprising: a computing device operably coupled to a first motion tracking device and a second motion tracking device, wherein the computing device is operative to: (a) wirelessly receive at least one data packet from the first motion tracking device located on a target and at least one data packet from the second motion tracking device located on the target; (b) detect a first angle of arrival or a first angle of departure of the at least one data packet wirelessly received from the first motion tracking device and a second angle of arrival or a second angle of departure of the at least one data packet wirelessly received from the second motion tracking device; (c) calculate at least one angle difference based at least on (i) the first angle of arrival and the second angle of arrival (ii) or the first angle of departure and the second angle of departure; and (d) determine whether the target is within a predetermined distance or predetermined distance range from the computing device based on the at least one angle difference and locations of the first motion tracking device and the second motion tracking device.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION

Figure 1:
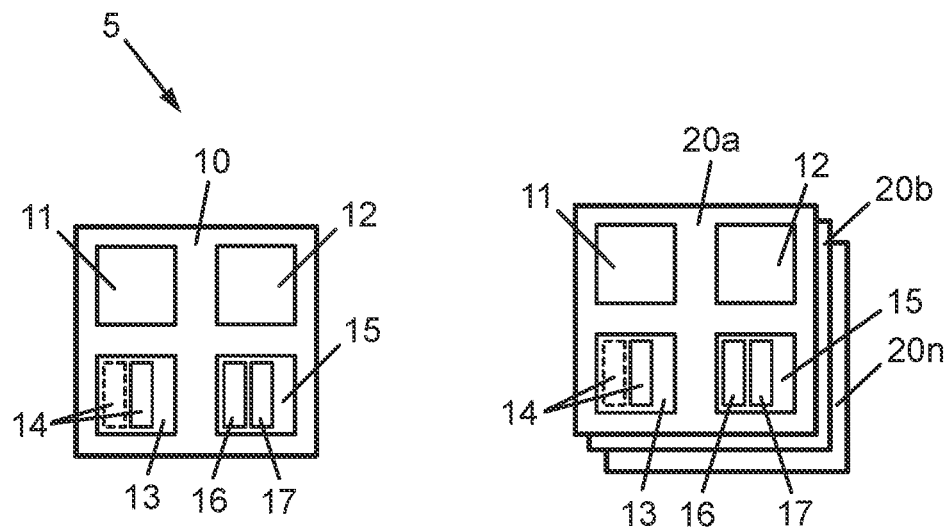
FIG. 1 shows a system in accordance with embodiments.

FIG. 1 shows a system 5 in accordance with embodiments, for example a motion tracking system. The system 5 includes a first device 10, and a plurality of second devices 20a-20n which may be identical or different; the plurality of second devices 20a-20n may include two second devices 20a, 20b, or more. When the system 5 is, for example, a motion tracking system, the first device 10 may be a computing device like e.g. a tablet, a mobile phone, a personal computer, etc., and the second devices 20a-20n be motion trackers.

The first and second devices 10, 20a-20n each includes at least one processor 11, at least one memory 12, a wireless communications module 13 for radiofrequency signal transmission and reception; optionally, the first device 10 and/or the second devices 20a-20n also include an inertial measurement unit 15, IMU. The inertial measurement units 15 include inertial sensors, for example, a gyroscope 16 and an accelerometer 17.

The wireless communications modules 13 of the first and second devices 10, 20a-20n each include one or more antennas 14 (one shown with dashed lines for illustrative purposes) for radiating and capturing electromagnetic waves.

The at least one memory 12 of the first and second devices 10, 20a-20n may have instructions and/or a computer program stored therein that, upon execution by the at least one processor 11, enable the respective device 10, 20a-20n to perform computations such as determination of the angle of arrival or the angle of departure of received electromagnetic waves (although the respective wireless communications module 13 might also make such determination), and determine whether a target is within a predetermined distance range from a device.

Although not illustrated, in some embodiments, the first device 10 and/or the second devices 20a-20n include an attaching device for attachment to a target, for instance to body members of a person; the attaching device might be any known in the art, e.g. straps, Velcro, etc.

Further, the first device 10 and/or the second devices 20a-20n might additionally include user presenting means (e.g. a screen, loudspeakers, etc.) and/or user input means (e.g. a touchscreen, a keyboard, etc.). For example, the first device 10 might present to a user how to arrange the second devices 20a-20n on the target (which may the user too), and/or which exercises shall be performed by the user during a physical rehabilitation procedure assisted by an automated motion tracking system; the first device 10 might require manual input by the user of dimensions thereof for the first device 10 to calculate the predetermined distance that pairs of second devices 20a-20n might be apart.

Figures 2A, 2B:
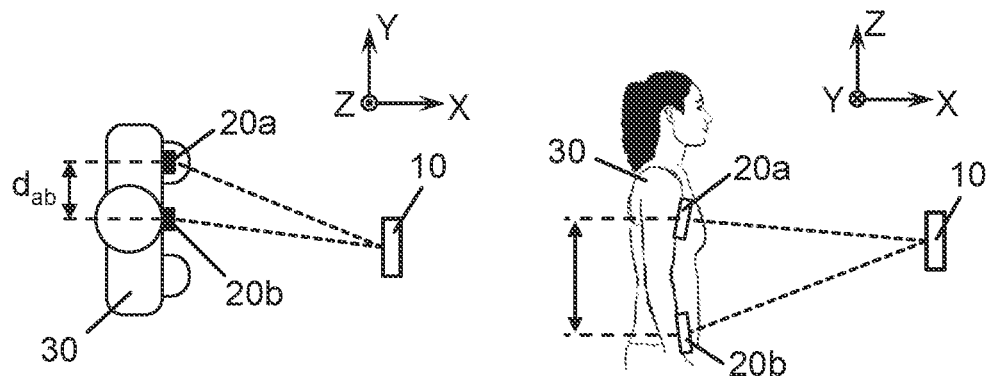
FIGS. 2A-2C show several ways of determining whether a target is within a certain range with methods in accordance with embodiments.
Figure 2C:
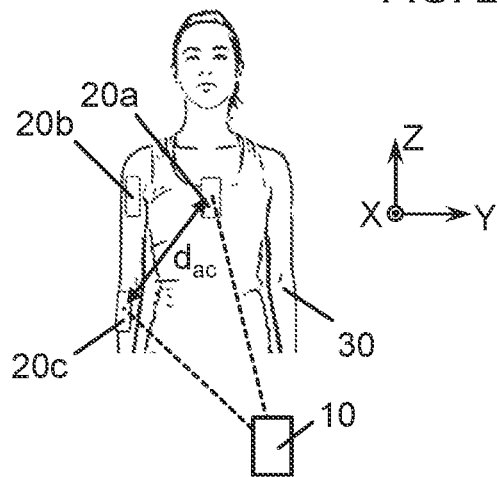

FIGS. 2A-2C show several ways of determining whether a target, in this case a person 30, is within a certain range from a remote first device 10 with methods in accordance with embodiments. For the sake of the following explanation only, a non-limiting set of Cartesian coordinates has been represented for better understanding of what is shown in the Figures. It will be noted that a different set of Cartesian coordinates could be represented as well.

In FIG. 2A, the person 30 is seen from above. The person 30 is facing towards a first device 10, and has at least two second devices 20a, 20b arranged such that they are apart according to the Y axis illustrated (which is contained in a horizontal plane defined by the X and Y axes illustrated) by a distance or gap $d_{ab}$. By way of example, one second device 20a is arranged on the chest of the person 30 and the other second device 20b is arranged on the left upper arm of the person 30.

Dashed lines have been represented showing segments between each second device 20a, 20b and the first device 10. The first device 10 is capable of determining whether the person 30 is within a certain range from the first device 10 by digitally processing either measured angles of arrival or measured angles of departure of wireless communications received from the second devices 20a, 20b.

FIG. 2B shows another example in which the person 30 is seen from the side and the second devices 20a, 20b are apart by a distance or gap $d_{ab}$ along the Z axis illustrated; the second devices 20a, 20b are arranged on the right upper and lower arm. The first device 10 is capable of making the aforesaid determination like in the example of FIG. 2A.

FIG. 2C shows another example in which the person 30 is seen from the front and several second devices 20a, 20b, 20c are arranged on different body members. One second device 20a is on the chest, another second device 20b is on the right upper arm, and the last second device 20c is on the right lower arm. The distances or gaps between each pair of second devices 20a-20c is along different axes in each case:

a first pair of devices 20a, 20b are apart along the Y axis illustrated (like in FIG. 2A), a second pair of devices 20b, 20c are apart along the Z axis illustrated (like in FIG. 2B), and a third pair of second devices 20a, 20c are apart along a composition of the Y and Z axes illustrated. In this example, the third pair of second devices 20a, 20c is explained, thus the distance or gap $d_{ab}$ between said second devices 20a, 20c has been represented.

The first device 10 may likewise determine whether the person 30 is within a certain range from the first device 10 based on the angles of arrival or angles of departure associated with the wireless communications transmitted by the respective second devices 20a, 20c to the first device 10.

If the person 30 were to be sideways relative to the first device 10, for example when the front of the person 30 forms an angle between e.g. 70° and 110° with respect to a front of the first device 10, the angles obtained by the first device 10 for the first pair or the third pair of second devices 20a-20c would be substantially small, and the distance or gap between each pair of second devices 20a-20c would not be representative of the determination to be made. In that case, the first device 10 may determine to use the RSSI values measured by one, some or all second devices 20a-20c, or resort to perform the angle-based determination with the second pair of second devices 20a-20c, which by being apart according to the Z axis do not alter the determination even if the person 30 is sideways.

In all cases of FIGS. 2A-2C, the first device 10 has data indicative of the gaps ($d_{ab}$, dac) for each pair of second devices 20a-20c that is to be considered. This means that the first device 10 associates: a certain gap with two second devices arranged on the upper arm and lower arm of a same arm, a certain gap with two second devices arranged on the chest and the upper arm, and so on.

Although in the above figures the second devices 20a-20c have been shown arranged on the person 30 on particular body members, namely the chest and upper and lower arms, it will be noted that any other body members could have a second device 20a-20c arranged thereon without departing from the scope of the present disclosure, for example but without limitation, thighs, shins, shanks, feet, pelvis, neck, forehead, etc.

It will also be apparent that the target does not necessarily have to be a person 30. By way of example, the target may be a robot, a drone, a remote controller for a computing apparatus like e.g. a computer or a video game console, a headset such as a virtual reality headset, one or more beacon devices that provide connectivity, data or orientation information, etc. Concerning the latter, the target can comprise a system of devices that usually have a fixed location; these may take benefit (or further benefit) from the disclosed methods and devices by not only determining whether they are at a predetermined distance from another device but also whether they have been moved (by assessing the evolution of the angles of arrival or angles of departure over time).

Figure 3:
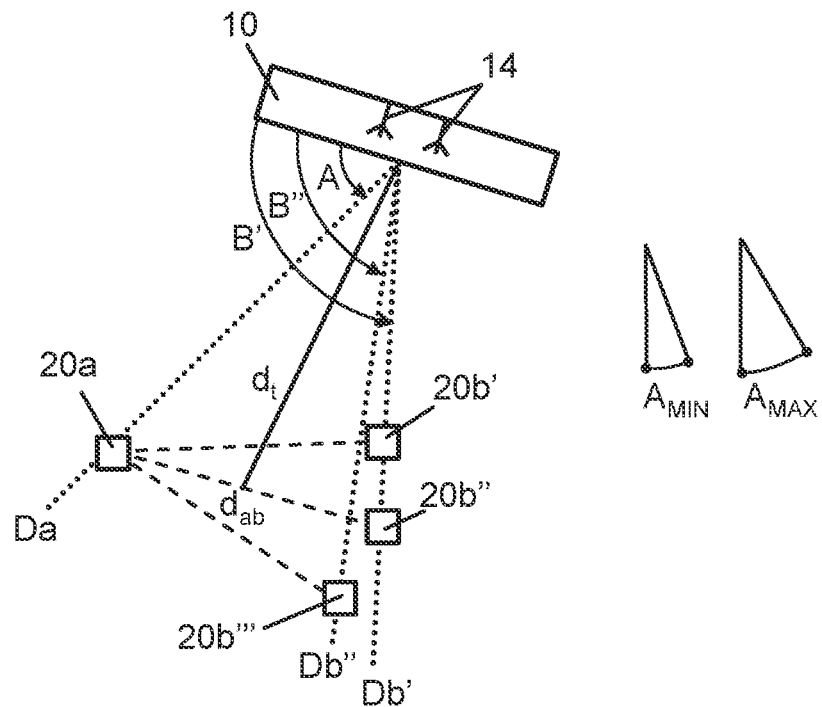
FIG. 3 shows how methods in accordance with some embodiments are capable of making the determination of the disclosure.

FIG. 3 shows how methods in accordance with some embodiments are capable of making the determination of the disclosure.

A first device 10 is apart from a target (not shown) that has at least a pair of second devices at predetermined locations thereof. Two antennas 14 of the antenna array of the first device 10 have been shown for clarity reasons. For the sake of the explanation, a second device 20a is at a predetermined location of the target whereas a plurality of predetermined locations is shown associated with the other second device 20b', 20b'', 20b'''.

Depending on the location of the second devices relative to the first device 10, the angle of arrival of wireless communications received at the first device 10 will be different. The angle for one of the second devices 20*a* is referenced as A, whereas two different angles B' and B" are shown for the other of the second devices 20*b*', 20*b*", 20*b*" depending on their predetermined locations (it is noted that the device 20*b*' and the device 20*b*" are at a same direction Db' relative to the first device 10 but at different distances). In this example, the reference for detecting the angles of arrival A, B', B" is parallel to one of the edges of the first device 10, but any other reference could be used instead because the angle difference that will exist between the different angles will be maintained regardless of the reference. The angle difference in this example is either B" minus A, or B' minus A.

A predetermined distance or gap $d_{ab}$ is either provided beforehand (already registered data or manually introduced by e.g. a user) in relation to the predetermined locations of the pair of second devices under consideration, or calculated with e.g. an optical sensor and at least one processor that processes image(s) of the second devices at the locations. By way of example, if the pair of second devices were to be the second devices 20*a*, 20*b*", which are at directions Da, Db' from the first device 10, the angle difference between the two would be B' minus A, the predetermined distance or gap would be $d_{ab}$, and the distance to the target would be $d_t$. With the angle difference and the gap $d_{ab}$, the distance $d_t$ can be computed by means of trigonometrical relationships.

In some occasions, minimum and maximum predetermined distances or gaps are considered rather than just a single predetermined distance or gap $d_{ab}$. Said values, which are not represented but could be named e.g. $d_{ab,MIN}$ and $d_{ab,MAX}$, result in the provision of two different triangles, each with one of the two gaps. In that case, distances $d_{t,MIN}$ and $d_{t,MAX}$ (not represented but calculable in the same fashion) are calculated and compared with the predetermined distance range to establish whether the target is within or outside of the range. If one of the distances does not fall within the predetermined distance range, the first device may be configured to determine that the target is outside of the range, or make the determination conditional on how much the value is outside the range relative to how much the other value is inside the range. That can be done, for instance, in the following manner:

$$\begin{cases} \Delta_{MIN} = |d_{t,MIN} - d_{ab,MIN}| \\ \Delta_{MAX} = |d_{t,MAX} - d_{ab,MAX}| \end{cases}$$

If the value outside the range is $d_{t,MIN}$ and the value inside the range is $d_{t,MAX}$ the first device may determine that the target is within the range if:

$$\Delta_{MAX} > \Delta_{MIN}$$

Minimum and maximum predetermined distances may be necessary whenever it is not accurately established what is the distance between the predetermined locations of the second devices, for example because the values have not been calibrated for the actual target. When the target is a person, there is variability in heights, widths and lengths, so if the predetermined distance has been set for people with a certain height, a user with a different height will have another predetermined distance between the locations. Hence, the predetermined distances can be set for people of different heights, and the determination be made with ranges of predetermined distances (or predetermined angles as explained next).

The determination of whether the target is within the predetermined distance range is made, in some embodiments, by comparing the angle difference with a predetermined angular range. In this example, minimum and maximum angles $A_{MIN}$, $A_{MAX}$ have been represented for the sake of clarity only, which delimit the predetermined angular range. By comparing the angular difference (e.g. B' minus A) with the $A_{MIN}$, $A_{MAX}$, the first device 10 establishes whether the target is within or outside of the predetermined distance range.

Figure 4:
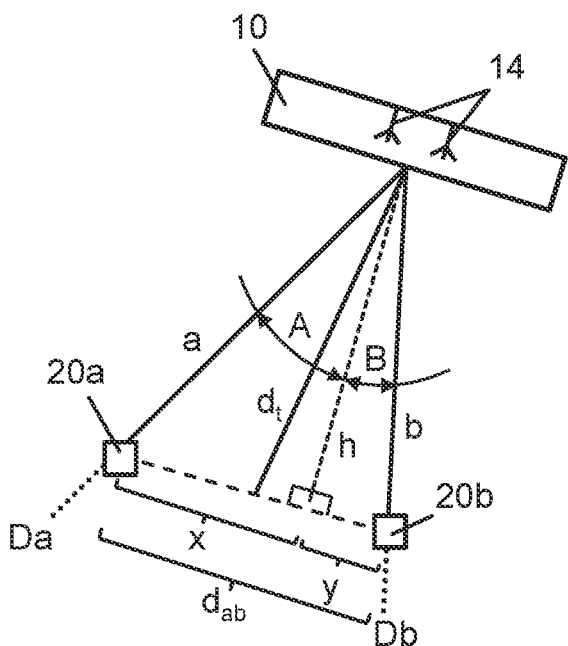
FIGS. 4, 5A-5B and 6 show several ways of estimating distance of a target in accordance with embodiments.

FIG. 4 shows an exemplary way of estimating distance of a target in accordance with embodiments.

Albeit not illustrated, the target has two second devices 20*a*, 20*b* at predetermined locations thereof. The predetermined distance or gap $d_{ab}$ between the two devices 20*a*, 20*b* is known.

A first device 10 measures angles of arrival A, B of signals wirelessly received from respective second devices 20*a*, 20*b*. The angles A, B are measured with respect to a predetermined direction (in this example it is parallel to dashed line h) of the first device 10. The angles A and B yield the angle difference between the two second devices 20*a*, 20*b* (corresponding to directions thereof Da, Db), which is A plus B due to them being at different sides of the predetermined direction.

With the angles A, B and the gap $d_{ab}$, the first device digitally provides two right triangles, one with base x and one with base y (with x plus y being g). Each of the two right triangles have one edge (h) that is parallel to the predetermined direction, which is known by the first device as it is a direction set by it as a reference for angle measurements. A system of equations can be defined by the first device to determine the distance $d_t$, which ranges from the first device 10 to the middle point of the predetermined distance or gap $d_{ab}$, by means of trigonometrical relationships. An exemplary system is as follows:

$$\begin{cases} d_{ab} = x + y \\ \tan(A) = x/h \\ \tan(B) = y/h \end{cases}$$

By calculating the length h, the length $d_t$ corresponding to the distance to the target can be computed as well, for instance by using trigonometrical relationships on a triangle formed by edges $d_t$ and h. In some cases, for instance depending on the considered predetermined distance range and/or the gap $d_{ab}$, the length h is a good estimation of the length $d_t$, thus the first device may simplify the evaluation by taking the length h as the distance to the target.

It will be noted that other systems aside from the one above are possible as well, including systems for calculating the length of edges a and b.

Figure 5A:
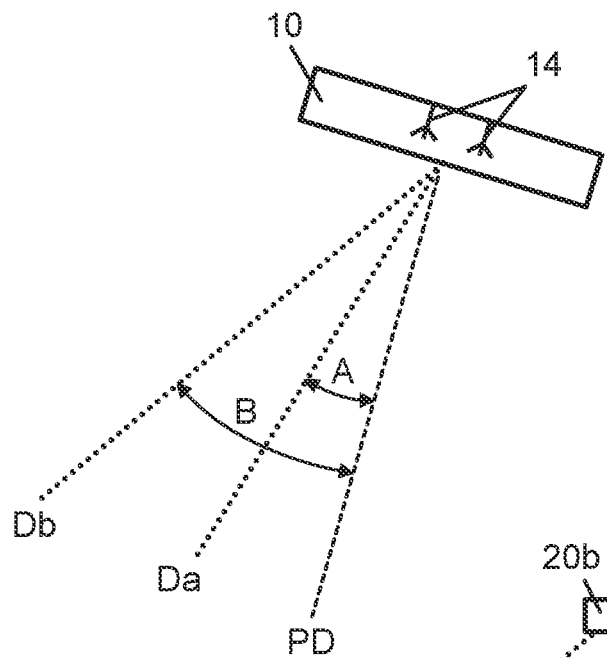
Figure 5B:
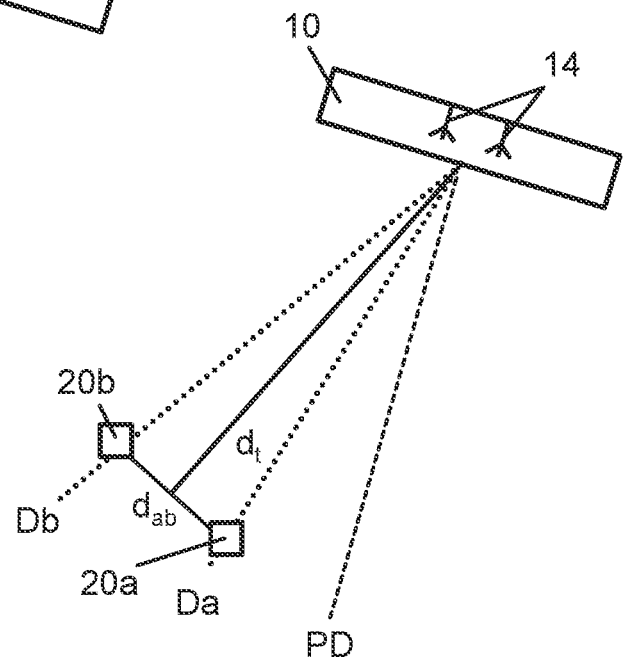

FIGS. 5A-5B show another exemplary way of estimating distance of a target in accordance with embodiments.

In FIG. 5A, a predetermined direction PD of the first device 10 is shown, and direction Da, Db are represented based on the angles of arrival A and B that the first device 10 has measured from wireless signals received from two second devices not shown in FIG. 5A. Although not illustrated in FIG. 5A, the first device 10 has data indicative of the gap that is to exist between the two second devices.

In FIG. 5B, the first device 10 has digitally provided an isosceles triangle with edges parallel to the directions Da, Db along which the two second devices 20a, 20b shall be based on the measured angles of arrival. The first device 10 takes the bisector from the vertex that the first device 10 is on, whose line is to correspond to the distance from the first device 10 to the target at the point it intersects the base of the isosceles triangle, preferably forming a right angle with the base. Owing to the knowledge of the gap $d_{ab}$, the first device finds the base of the isosceles triangle which has the length $d_{ab}$, which automatically locates the positions of the second devices 20a, 20b. Once the base is provided, the distance $d_t$ can be computed by e.g. using trigonometrical relationships: the angles from the vertex where the first device 10 is are, at each side of the segment $d_t$, B minus A divided by two.

Figure 6:
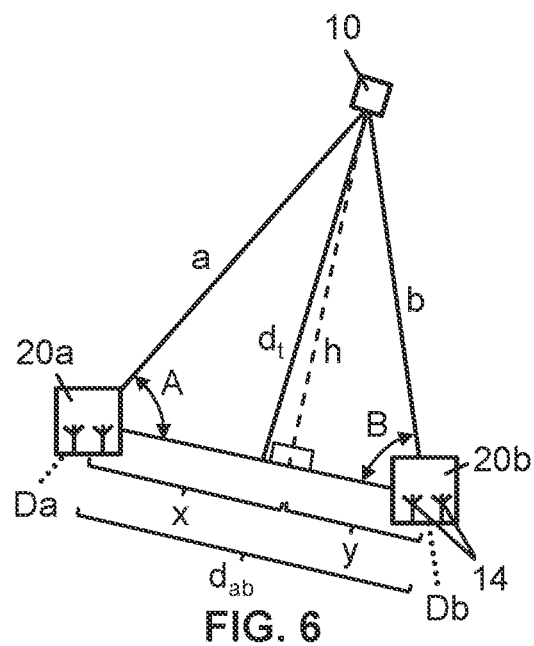
Figure 7:
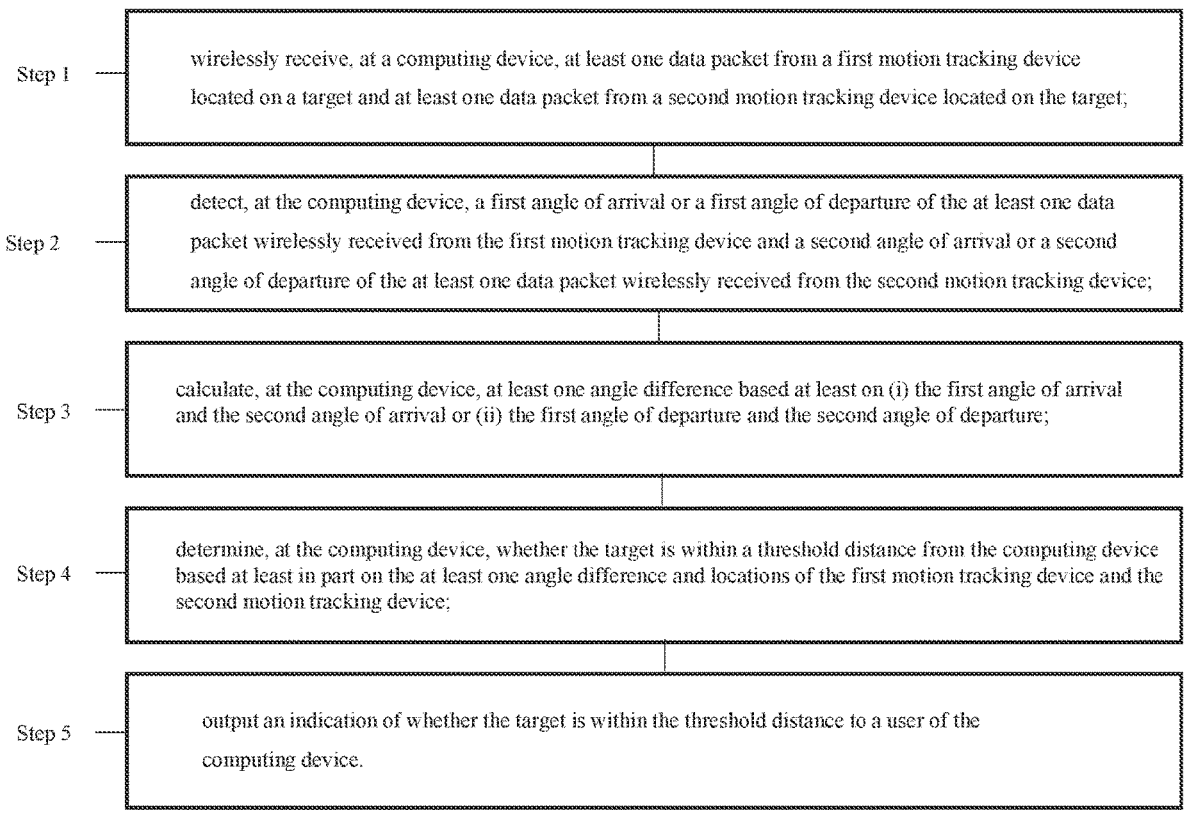
FIG. 7 illustrates example steps of a method for estimating the distance of a target in accordance with embodiments described herein.

FIG. 6 shows yet another exemplary way of estimating distance of a target in accordance with embodiments.

A first device 10 wirelessly receives a plurality of signals from at least two second devices 20a, 20b that are at predetermined locations of a target (not shown). Each antenna 14 of the plurality of antennas 14 of the second devices 20a, 20b causes the transmission of a wireless signal for a same data packet, the processing of which by the first device 10 enables determination of the angle of departure A, B of the signals that were transmitted by the respective second device 20a, 20b.

The first device 10 thus has the angles of departure A, B, and the predetermined distance or gap $d_{ab}$, and one exemplary way of calculating the distance $d_t$ is as follows.

With the angles A, B, the first device 10 digitally establishes directions Da, Db where the two second devices 20a, 20b are. And with the predetermined distance or gap $d_{ab}$, the first device 10 digitally establishes edges a and b of the triangle. In a fashion similar to that explained with reference to the embodiments of FIG. 4, the first device 10 computes length h that produces respective right triangles on each side, one with base x and one with base y. Upon solving a system of equations, the first device 10 may either consider length h as the distance it is from the target, or compute distance $d_t$ whose endpoints are the first device 10 and the middle point of the base of the large triangle having gap $d_{ab}$ as one of the edges, and a and b as the other two edges.

By way of example, the distance $d_t$, which is a median of the triangle, can be computed with a formula like the following one:

$$d_t = \sqrt{\frac{a^2 + b^2 - d_{ab}^2}{4}}$$

It will be apparent for the person skilled in the art that there are other possible formulas for calculating said distance, all of which falling within the scope of the present disclosure.

In this text, the term "includes", "comprises" and its derivations (such as "including", "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method comprising:
   (a) wirelessly receiving, at a computing device, at least one data packet from a first motion tracking device located on a target and at least one data packet from a second motion tracking device located on the target;
   (b) detecting, at the computing device, a first angle of arrival or a first angle of departure of the at least one data packet wirelessly received from the first motion tracking device and a second angle of arrival or a second angle of departure of the at least one data packet wirelessly received from the second motion tracking device;
   (c) calculating, at the computing device, at least one angle difference based at least on (i) the first angle of arrival and the second angle of arrival or (ii) the first angle of departure and the second angle of departure;
   (d) determining, at the computing device, whether the target is within a threshold distance from the computing device based at least in part on the at least one angle difference and locations of the first motion tracking device and the second motion tracking device; and
   (e) outputting an indication of whether the target is within the threshold distance to a user of the computing device.

2. The method of claim 1, wherein the first motion tracking device is located at a first location on the target, and wherein the second motion tracking device is located at a second location on the target.

3. The method of claim 2, further comprising calculating the distance separating the first motion tracking device and the second motion tracking device based on the first location and the second location.

4. The method of claim 1, further comprising calculating a distance between the computing device and the target based on the at least one angle difference and the distance separating the first motion tracking device and the second motion tracking device.

5. The method of claim 1, wherein the method comprises calibrating the computing device for a measurement of the target when the target is within the threshold distance.

6. The method of claim 5, wherein determining whether the target is within the threshold distance comprises:
   estimating a distance of the target from the computing device based on: the at least one angle difference, and a distance between a location of the first motion tracking device and a location of the second motion tracking device; or
   checking whether each of the at least one angle difference is within a predetermined angle range for the locations of the first motion tracking device and the location of the second motion tracking device.

7. The method of claim 1, wherein the method does not comprises calibrating the computing device for a measurement of the target prior to the determining of step (d).

8. The method of claim 1, wherein calculating the at least one angle difference comprises:
   calculating a first angle difference between the first angle of arrival of the first motion tracking device and a fixed direction, and a second angle difference between the second angle of arrival of the second motion tracking device and the fixed direction.

9. The method of claim 8, wherein determining whether the target is within the threshold distance comprises estimating a distance between the target and the computing device based on the first and second angle differences, the fixed direction, and a distance between a location of the first motion tracking device and a location of the second motion tracking device.

10. The method of claim 1, wherein the step of determining whether the target is within the threshold distance from the computing device is made further when the at least one angle difference is less than a maximum angle difference threshold.

11. The method of claim 1, further comprising estimating, at the computing device, the distance of the target from the computing device based on received signal strength indicators associated with one or more packets received from the computing device at the first motion tracking device and the second motion tracking device.

12. The method of claim 1, further comprising repeating the steps of (b)-(e) when the at least one angle difference is greater than a minimum angle difference threshold.

13. The method of claim 1, wherein the computing device and the first motion tracking device and the second motion tracking device form at least a part of a motion tracking system.

14. The method of claim 13, wherein the first motion tracking device and the second motion tracking device each comprises an inertial measurement unit.

15. The method of claim 14, further comprising processing, at the computing device, wirelessly received measurements of the inertial measurement unit of each of the first motion tracking device and the second motion tracking device to provide a motion tracking sequence of the target when the computing device determines that the target is within the predetermined distance range from the computing device.

16. The method of claim 14, further comprising halting, at the computing device, a motion tracking process when the computing device determines that the target is not within the threshold distance from the computing device.

17. The method of claim 16, wherein halting the motion tracking process further comprises:
indicating how to move the target to bring the target within the threshold distance.

18. The method of claim 1, further comprising processing, at the computing device, one or more images of the target taken by an optical sensor; and at least one of:
validating, based on the one or more processed images, that the first motion tracking device and the second motion racking device are arranged at a first location and a second locations of the target.

19. The method of claim 1, wherein the at least one angle difference is calculated based on (i) the first angle of arrival and the second angle of arrival.

20. The method of claim 1, wherein the at least one angle difference is calculated based on (ii) the first angle of departure and the second angle of departure.

21. The method of claim 1, wherein the at least one angle difference is calculated based on both (i) the first angle of arrival and the second angle of arrival and (ii) the first angle of departure and the second angle of departure.

22. A computing device comprising at least one processor, the at least one processor operative to:
(a) wirelessly receive at least one data packet from a first motion tracking device located on a target and at least one data packet from a second motion tracking device located on the target;
(b) detect a first angle of arrival or a first angle of departure of the at least one data packet wirelessly received from the first motion tracking device and a second angle of arrival or a second angle of departure of the at least one data packet wirelessly received from the second motion tracking device;
(c) calculate at least one angle difference based at least on (i) the first angle of arrival and the second angle of arrival (ii) or the first angle of departure and the second angle of departure;
(d) determine whether the target is within a threshold distance from the computing device based on the at least one angle difference and locations of the first motion tracking device and the second motion tracking device; and
(e) output an indication of whether the target is within the threshold distance to a user of the computing device.

23. A motion tracking system comprising:
a computing device operably coupled to a first motion tracking device and a second motion tracking device, wherein the computing device is operative to:
(a) wirelessly receive at least one data packet from the first motion tracking device located on a target and at least one data packet from the second motion tracking device located on the target;
(b) detect a first angle of arrival or a first angle of departure of the at least one data packet wirelessly received from the first motion tracking device and a second angle of arrival or a second angle of departure of the at least one data packet wirelessly received from the second motion tracking device;
(c) calculate at least one angle difference based at least on (i) the first angle of arrival and the second angle of arrival (ii) or the first angle of departure and the second angle of departure;
(d) determine whether the target is within a threshold distance from the computing device based on the at least one angle difference and locations of the first motion tracking device and the second motion tracking device; and
(e) output an indication of whether the target is within the threshold distance to a user of the computing device.

* * * * *